United States Patent Office 3,428,625
Patented Feb. 18, 1969

3,428,625
PROCESS FOR THE CONTINUOUS MANUFACTURE OF LAUROLACTAM IN THE LIQUID PHASE
Gunther Strauss, Marl, Germany, assignor to Chemische Werke Huls A.G., Marl, Germany
No Drawing. Filed Sept. 23, 1966, Ser. No. 581,455
Claims priority, application Germany, Oct. 1, 1965,
C 37,024
U.S. Cl. 260—239.3                                        7 Claims
Int. Cl. C07d 41/06

ABSTRACT OF THE DISCLOSURE

In a process for the continuous manufacture of laurolactam in the liquid phase by the steps of oximation and Beckmann rearrangement, the improvement in the oximation step which leads to faster reaction times and a purer final product, comprising reacting cyclododecanone with a hydroxyl amine salt in the liquid phase in an aliphatic or cycloaliphatic solvent immiscible with sulfuric acid, the important oximation reaction conditions being that the pH be 2 to 7, preferably 3 to 5, that the reaction temperature be 80–120° C., preferably 90–100° C., and that the conversion of the cyclododecanone to cyclododecanone oxime be terminated after the conversion reaches 80–97%, preferably 90–95%; and that the solvent be separated before conducting the Beckmann rearrangement.

---

The present invention relates generally to an improvement in the continuous process of manufacturing lactams by the Beckmann rearrangement of cyclic ketoximes in the presence of concentrated $H_2SO_4$ or oleum, and particularly to the improvements in the composition and method of preparing the oxime starting materials.

According to the prior art methods of lactam production such as disclosed in U.S. Patent No. 2,817,661, cyclopentanone oxime, cyclohexanone oxime, cycloheptanone oxime and alkylated derivatives thereof are subjected to the Beckmann rearrangement in the presence of concentrated $H_2SO_4$ (e.g., 90–100%) or oleum. The oximes, produced by the oximation of cycloaliphatic ketones, are reacted with concentrated $H_2SO_4$ and substantial amounts of heat are developed.

The prior art was further advanced by the disclosure of Günther Strauss and Walter Thomas in their U.S. patent application Ser. No. 524,395 filed Feb. 2, 1966, and entitled, "Process for the Continuous Manufacture of Laurolactam in the Liquid Phase," the disclosures of which are incorporated herein. Application Ser. No. 524,395 will hereafter be referred to as the basic application.

The state of the art has been advanced still further by the disclosures of Karl-Hans Simmrock and Günther Strauss in their U.S. patent application Ser. No. 577,172 filed 6th of September 1966, and entitled "Refinements in the Distillation of Lactams from Solutions Thereof," the disclosures of which are incorporated herein. Application Ser. No. 577,172 will hereafter be referred to as the distillation refinement application.

Prior to the discoveries of the basic application the continuous production of laurolactam in the liquid phase by oximation of cyclododecanone and subsequent Beckmann rearrangement of the cyclododecanone oxime was not technically feasible because of the water-insolubility and melting points of the oxime and the lactam where the oxime melting point of 132° C. and the lactam melting point of 150° C. lie considerably above the boiling point of water.

According to the prior art the oximation of the cyclododecanone and the Beckmann rearrangement have been conducted in the liquid phase so that the reaction takes place above 70° C. and in the presence of a cycloaliphatic solvent immiscible with water. The proportion of the solvent is maintained high so that the mixture of solvent and cyclododecanone oxime is liquid in the presence of the aqueous hydroxylamine oximation solution at the reaction temperature. After separating the aqueous phase, the liquid oxime-solvent mixture is subjected to Beckmann rearrangement and a second liquid lactam-solvent mixture results therefrom. According to a particular embodiment of the prior art as disclosed in the Swiss patent application 1070/64, cyclododecanone is used as the solvent and the oximation is conducted up to only a 40–65% conversion of the cyclododecanone. Therefore, the liquid mixture of oxime and cyclododecanone, undergoing the Beckmann rearrangement contains approximately 35–60% cyclododecanone.

Because of the high proportion of solvent in the Beckmann rearrangement stage unavoidable losses result under the temperature and time conditions required for a quantative rearrangement since the proposed solvents do not exhibit the desired stability against concentrated sulfuric acid or oleum. The high temperatures involved in the reaction give rise to local overheating and thus additionally contribute to the increased conversion of the solvent into undesired by-products and this has adverse consequences for the yield and quality of the lactam.

According to the nature of the reaction, overheating is the greatest danger and a larger solvent proportion must be maintained for obtaining a phase which is liquid under the reaction conditions.

Some of the disadvantages of the prior art have been overcome by the method disclosed in the basic application wherein the Beckmann rearrangement is conducted with the following conditions and steps employed:

(a) The oxime dissolved in a solvent immiscible with sulfuric acid or oleum is mixed with sulfuric acid or oleum at the low temperatures of 0–60° C., preferably 20–50° C., and the oxime is extracted from the solvent during this stage;

(b) The liquid solvent-free oxime-containing sulfuric acid phase is separated from the oxime-free solvent phase;

(c) The oxime-sulfuric acid is converted into the lactam in a subsequent rearrangement stage;

(d) The lactam-sulfuric acid mixture is hydrolyzed with the simultaneous addition of water and a solvent;

(e) The lactam-containing solvent phase is separated from the dilute sulfuric acid; and (f) The lactam-containing solvent phase is washed and then processed by fractional distillation.

The advantage of the process of the basic application resides in that more than 60% of the heat necessary to be dissipated during the process is removed in the extraction stage and the rearrangement stage is substantially freed from the detrimental heat of reaction with the production of lactam having excellent quality and high yields. The process of the basic application combines the advantages of having liquid reaction phases and a rearrangement stage conducted in the absence of a solvent.

The sulfuric acid immiscible solvents used in the extraction stage of the basic application are, for example, cycloaliphatic hydrocarbons, such as hydrocumene, diisopropylcyclohexane, ethylcyclohexane, or also aliphatic hydrocarbons, such as, for example, octane, nonane, decane. The boiling points of the solvents employed range between 100 and 200° C., and preferably from 100 to 180° C.

According to a particularly advantageous embodiment disclosed in the basic application and further developed in the distillation refinement application, the process is conducted with two separate solvent cycles, one in the extraction stage and one in the hydrolysis stage. In the hydrolysis stage the requirements with respect to the resistance of the solvent to the sulfuric acid are not very high since the solvent in this stage contacts only dilute sulfuric acid. There is a particular advantage in using cyclododecanone as the solvent in the second solvent cycle to an amount sufficient for maintaining the liquid phase. The solution employed in the extraction stage of this process contains only the oxime in addition to the solvent.

In carrying out the process of the basic application, it has been found that considerable economies can be realized in the preceding stage of oximating the cyclododecanone even though the lactam has been produced in a liquid phase with the elimination of the solvent from the rearrangement stage.

According to the present invention, it has been discovered that oximating the cyclododecanone up to a conversion of 80–97% prior to carrying out the processes of the basic application and the distillation refinement application results in a substantial increase in the production of the oximation stage with an avoidance of the disadvantages of the high ketone proportion in the rearrangement stage.

It is an object of the present invention to provide improved economies in the process for the production of laurolactam by the Beckmann rearrangement of cyclododecanone oxime.

Another object of the present invention is a continuous process for the production of laurolactam from cyclododecanone.

Still another object of the present invention is a cyclododecanone oxime solvent composition having a low ketone concentration.

Other objects of the present invention include the prevention of ketone loss in the Beckmann rearrangement.

Further objects and the entire scope of applicability of the present invention are obvious from the detailed description, examples and claims which follow.

The laurolactam produced by the present invention is useful in the preparation of polymers and the extrusion thereof into synthetic fibers as disclosed in Chemical Abstracts (1964), vol. 60, p. 3107, and the U.S.S.R. periodical abstracted therein.

According to the present invention the oximation of the cyclododecanone is conducted in the presence of a solvent. This solvent must:

(a) Have a sufficient solubility for the cyclododecanone or cyclododecanone oxime, at least within the temperature range intended for conducting the oximation;

(b) Have, although not absolutely necessary, a high boiling point so that the oximation can be conducted at normal atmospheric pressure with a simplified apparatus;

(c) Have resistance to sulfuric acid or oleum in the extraction stage, at the temperatures employed therein; and (d) Not mix with the sulfuric acid or oleum in the extraction stage, at the temperatures employed therein.

Suitable solvents are, preferably, cycloaliphatic hydrocarbons, such as, for example, ethylcyclohexane, diisopropylcyclohexane, particularly hydrocumene. Aliphatic hydrocarbons—as far as they satisfy the above-disclosed requirements, such as octane, nonane, decane, can also be used. Aromatic solvents are not actually excluded, but they should be avoided because they are readily sulfurized.

The solvents employed have boiling points between 100 and 200° C., and preferably between 100 and 180° C.

The solvents are, of course, present in the reaction mixture in such an amount that the reaction mixture is still fluid at the reaction temperature.

Thus, for example, a liquid phase is readily ensured when a 40% solution of cyclododecanone in hydrocumene is oximated in the presence of an aqueous hydroxylamine salt solution up to a conversion of 95%.

Suitable oximation agents are an aqueous hydroxylamine salt solution, preferably a hydroxylamine sulfate solution.

The hydroxylamine salt solution has generally a concentration of 1 to 10, preferably 5 to 8% by weight.

The oximation is conducted at a temperature of from 80 to 120, preferably 90 to 100° C., with the addition of an alkaline agent, such as, for example, ammonia, preferably sodium hydroxide, to produce a pH value between 2 and 7, but preferably between 3 and 5.

The reaction mixture is maintained fluid for the operating temperatures given above when the concentration of cyclododecanone in the solvent varies, generally between 30 and 70%, and preferably between 30 and 40%.

The amount of hydroxylamine employed is less than the stoichiometrically equivalent quantity, based on the cyclododecanone. Generally, the amount corresponding to the desired ketone conversion is used. Suitably, the oximation is conducted in a countercurrent device having at least two stages, whereby the complete consumption of the hydroxylamine employed is ensured.

The oximation of the ketone is conducted up to a conversion of 80–97%, preferably 90–95%, i.e., the mixture of cyclododecanone oxime, cyclododecanone, and solvent produced contains 3–20%, preferably 5–10% cyclododecanone, based on the mixture of cyclododecanone and cyclododecanone oxime.

From the following table the dependence of the conversion of an oximation reaction upon the reaction time can be seen.

OXIMATION OF CYCLODODECANONE WITH HYDROXYLAMINE IN AN AQUEOUS EMULSION AT 100° C.

| Reaction time, hours: | Conversion, percent |
| --- | --- |
| 0.5 | 83 |
| 1.0 | 92 |
| 1.5 | 94 |
| 2.0 | 95 |

Although the above-mentioned conversion data are true, of course, only for a specific reaction system, since the progress of the oximation reaction depends upon very many factors, such as temperature, intensity of agitation, use of emulsifiers, pH value, concentrations, the principles illustrated thereby are not impaired as to their validity.

According to the above, there is achieved a decisive saving in reaction time in the oximation stage, in spite of a high ketone conversion of, for example, 90–95%. This conversion range of 90–95% does not permit a processing of the liquid phase cyclododecanone oxime in cyclododecanone according to the conventional method of operation, because of the high point of solidification of the resultant mixture. This can be seen from the solidification points of mixtures of cyclododecanone and cyclododecanone oxime or laurolactam tabulated in the following table.

| Percent cyclododecanone in the mixture | Solidification of the mixtures in ° C. | |
| --- | --- | --- |
| | With cyclododecanone oxime | With laurolactam |
| 0 | 131.8 | 149.5 |
| 2 | ---------- | 147.8 |
| 5 | ---------- | 144.5 |
| 10 | 127.1 | 140.0 |
| 25 | 76.9 | 125.0 |

The liquid reaction mixture of cyclododecanone, cyclododecanone oxime, and solvent can easily be separated from the aqueous solution and, if required, can be washed with hot water. The separated solution is supplied to the extraction stage at a temperature high enough to avoid the crystallization of the oxime. The extraction process is conducted with concentrated sulfuric acid or oleum at temperatures between 0 and 60° C., preferably between 20 and 50° C.; and the heat produced by reacting the oxime with the sulfuric acid and the heat originally introduced are removed.

The cyclododecanone oxime is removed from the solvent in practically quantitative amounts and is taken up by the sulfuric acid phase. In contradistinction thereto, the ketone is taken up by the sulfuric acid only in part because of the substantially weaker base-character of the ketone; thus, the ketone partially remains in the solvent and is recycled to the oximation stage together with the latter.

The proportion of ketone taken up by the sulfuric acid together with the oxime is dependent upon the quantitative ratio of oxime:sulfuric acid and upon the ketone content of the oxime. In accordance with the invention, and as a result of the small amount of ketone available for the Beckmann rearrangement, the amounts of ketone lost in the rearrangement stage together with the oxime lost by side reactions are greatly reduced even though conditions are desirably maintained under which as much ketone as possible, together with the solvents, is again recycled directly to the oximation stage.

The following table shows the residual content of ketone in the oxime-sulfuric acid mixture after the extraction of a 30% oxime-ketone solution in hydrocumene at 40° C.

| Percent Ketone in the Oxime Before (a) and After (b) the Extraction, Oxime:Sulfuric Acid in a Weight Ratio | | | | | |
|---|---|---|---|---|---|
| 1:0.8 | | 1:1 | | 1:1.25 | |
| (a) | (b) | (a) | (b) | (a) | (b) |
|  |  | 6.5 | 5.1 | 6.5 | 5.8 |
|  |  | 10.7 | 7.5 | 10.7 | 9.5 |
|  |  | 14.6 | 9.7 | 14.6 | 12.6 |
| 25.1 | 14.3 | 25.3 | 20.4 |  |  |

After separating the liquid, oxime-containing, solvent-free sulfuric acid phase from the oxime-free solvent phase, the ketone-containing mixture of the oxime-sulfuric acid is passed to the rearrangement stage, and there the rearrangement of the oxime into the lactam is conducted at temperatures between 60 and 140° C., preferably between 90 and 120° C.

The lactam-sulfuric acid mixture obtained as above is treated with water in the subsequent hydrolysis stage; and at the same time, a solvent is added. Advantageously, cyclododecanone itself is used as the solvent and enough cyclododecanone is employed to ensure a liquid phase.

For example, in case the hydrolysis and the subsequent washing step are conducted at about 95° C., the amount of cyclododecanone added produces a mixture of ketone and lactam having a ketone proportion of about 55 parts by weight.

After separating the lactam-containing solvent phase from the lactam-free phase of diluted sulfuric acid, the lactam-containing solvent phase is washed and subsequently distilled—preferably under subatmospheric pressure.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

10,630 grams of a solution of 3,154 grams cyclododecanone in hydrocumene are reacted in a vessel having an agitator with 1,421 grams hydroxylamine sulfate in an approximately 8% aqueous solution. Vigorous agitation is applied at a temperature of 90–95° C. and a pH of 4.5 is maintained constant by the continuous addition of 15% sodium hydroxide solution. The oximation is interrupted at a conversion of 94.9% by separating the two phases. The hydroxylamine still present in the aqueous phase is employed once again in a further charge, or, in case of a continuous, particularly multistage process, in accordance with the countercurrent principle.

The hydrocumene solution containing 3,242 grams cyclododecanone oxime and 160 grams cyclododecanone is passed to the extraction stage and is there extracted with agitation and under cooling at a temperature of about 40° C., by means of 4,000 grams 96% sulfuric acid.

After separating, the oxime-free hydrocumene still contains small amounts of ketone and the liquid extraction product of oxime-containing sulfuric acid is fed continuously to a two-stage Beckmann rearrangement system and is there rearranged at a temperature of 105° C. and a reaction time of twice 30 minutes.

In the hydrolysis stage, which follows, the rearrangement product is hydrolyzed with water and the hydrocumene separated in the previous stages is added thereto. After passing through a washing stage, the hydrocumene solution containing the lactam is processed by distillation. The products obtained are 3,087 grams laurolactam, as well as 141.5 grams cyclododecanone. This corresponds to a lactam yield of 95.2% (based on converted ketone) and a ketone yield of 88.5% (based on unreacted ketone). The result is a total yield of 94.8% of lactam and ketone, based upon the ketone introduced into the oximation stage and converted to 94.3%.

The elapsed time is two hours.

EXAMPLE 2

An oximation is conducted as in Example 1 and is continued to a conversion of 99%. After the extraction, rearrangement, and hydrolysis, likewise conducted analogously, the washed solution of lactam in hydrocumene is processed by distillation. The yield in lactam (based on converted ketone) corresponds to the previous example, being 95.4%; the ketone yield (based on unreacted ketone) amounts to 50%. There is obtained a total yield of likewise 94.9%, based on the ketone introduced into the oximation stage and converted to 99%.

The time elapsed is six hours.

EXAMPLE 3

An oximation conducted analogously to Example 1 is interrupted after a reaction time of ½ hour at a conversion of about 73%. The thus-obtained solution of 3,236 grams oxime and 1,095 grams ketone in about 8,000 grams hydrocumene is extracted in the extraction stage with 4,000 grams sulfuric acid and the entire oxime, as well as 829 grams ketone are carried along with 266 grams ketone remaining in the solvent. After continuously rearranging the extraction mixture in a two-stage apparatus at 105° C. and a reaction time of twice 30 minutes, as well as after having it passed through the hydrolysis and washing stages, there are obtained by distillation: 2,870 grams lactam, corresponding to 88.7% (based on reacted ketone), as well as 903 grams ketone, corresponding to 82.6% (based on unreacted ketone). There results a total yield of 87.3% of lactam and ketone, based on the total ketone introduced into the oximation stage.

The preceding examples can be repeated with similar success by substituting the generically and specifically described reactants and operating conditions of this invention for those used in the preceding examples.

From the foregoing description, one skilled in the art can easily acertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An improvement in the process for recovering laurolactam from the reaction mixture obtained by sulfuric acid rearrangement of cyclododecanone oxime comprising:

(a) reacting in the liquid phase at a pH of 2–7, cyclododecanone dissolved in a first solvent boiling at 100–200° C. and immiscible with sulfuric acid with a hydroxylamine salt in less than stoichiometric proportions at a temperature about 80 to 120° C. and converting about 80 to 97% of said cyclododecanone to cyclododecanone oxime dissolved in said first solvent;

(b) mixing concentrated sulfuric acid with the solution of said cyclododecanone oxime and first solvent at a temperature about 0 to 60° C. and forming a solution of cyclododecanone oxime in sulfuric acid;

(c) separating said solution of cyclododecanone oxime in sulfuric acid from said first solvent;

(d) reacting said solution of cyclododecanone oxime in sulfuric acid at a temperature about 60 to 140° C. and rearranging said cyclododecanone oxime to laurolactam and forming a mixture of laurolactam and sulfuric acid;

(e) hydrolyzing said mixture of laurolactam and sulfuric acid with water and a second solvent immiscible with sulfuric acid and forming a laurolactam containing solvent phase and a dilute sulfuric acid phase;

(f) separating said laurolactam containing solvent phase and said dilute sulfuric acid phase; and (g) recovering laurolactam from said laurolactam containing solvent phase.

2. The process of claim 1, wherein the temperature of oximating step (a) is maintained at about 90 to 100° C., the temperature of mixing step (b) is maintained at about 20 to 50° C., and the rearrangement temperature of (d) is maintained at about 90 to 120° C.

3. The process of claim 1, wherein about 90 to 95% of said cyclododecanone of (a) is converted to cyclododecanone oxime.

4. The process of claim 1, wherein the pH of step (a) is maintained at about 3 to 5.

5. The process of claim 3 wherein the pH is maintained at about 3 to 5.

6. The process of claim 2 wherein the pH of step (a) is maintained at about 3 to 5, and about 90–95% of said cyclododecanone of (a) is converted to cyclododencanone oxime.

7. A process as defined by claim 6 wherein the weight concentration of cyclododecanone in the solvent in step (a) is 30–40%.

References Cited

UNITED STATES PATENTS

| | | | |
|---|---|---|---|
| 3,060,173 | 10/1962 | Von Schickh et al. | 260—239.3 |
| 3,334,089 | 8/1967 | Harms et al. | 260—239.3 |
| 1,248,252 | 10/1960 | France | 260—566 |
| 2,249,177 | 7/1941 | Schlack | 260—239.3 |
| 2,313,026 | 3/1943 | Schlack | 260—239.3 |
| 2,573,374 | 10/1951 | Wichterle | 260—239.3 |
| 2,692,878 | 10/1954 | Kahr | 260—239.3 |
| 3,265,733 | 8/1966 | Doerfel et al. | 260—566 |

FOREIGN PATENTS 972,107  10/1964  Great Britain.

LENNY R. JILES, *Primary Examiner.*

R. T. BOND, *Assistant Examiner.*

U.S. Cl. X.R.

260—566